United States Patent Office 2,850,439
Patented Sept. 2, 1958

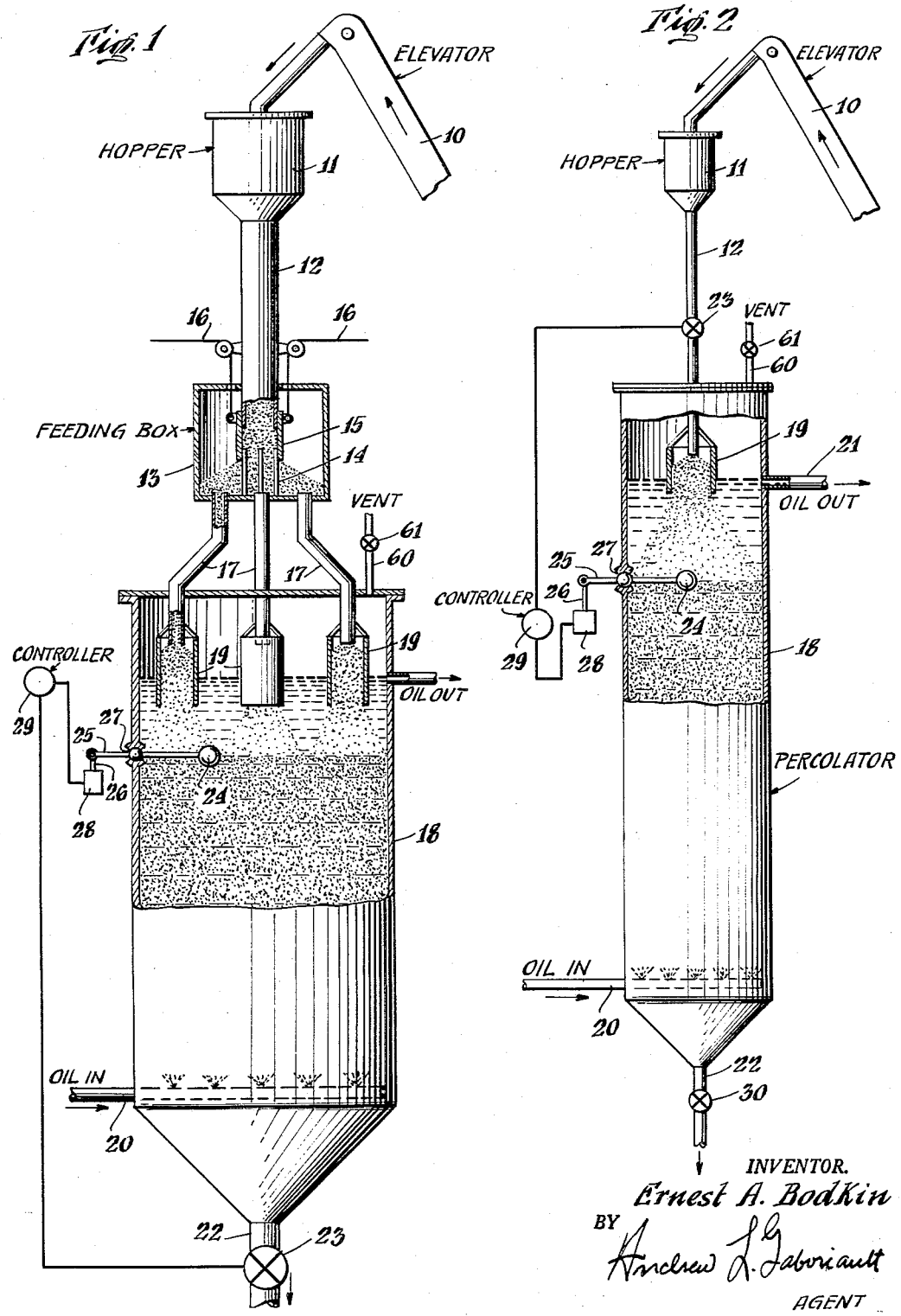

2,850,439

LIQUID SOLIDS CONTACTING

Ernest A. Bodkin, Wenonah, N. J., assignor to Socony Mobil Oil Company, Inc., a corporation of New York Application October 22, 1953, Serial No. 387,743

5 Claims. (Cl. 196—147)

This application is a continuation-in-part of application Serial No. 237,189, filed in the United States Patent Office on July 17, 1951, and now abandoned.

This invention relates to processes for contacting liquids with a moving columnar mass of granular solids, and more particularly to a method for maintaining the upper level of the columnar mass of granular solids constant in such processes.

Typical of the processes to which this invention applies is the process for treating a lubricating oil of low asphalt content with a solid granular adsorbent for the purpose of removing small amounts of undesirable impurities therefrom. Such purification may accomplish decolorization or neutralization of the oil, or removal of suspended, colloidal or dissolved impurities, such as carbon or coke or oxygen or nitrogen containing impurities. Other typical processes to which this invention applies are water treatment with granular ion exchange materials, the conversion of hydrocarbons in liquid phase in the presence of a granular catalytic or inert material, and the revivification of granular solid adsorbents by contacting the adsorbent with a liquid organic solvent capable of removing the impurities adhering to the adsorbent.

In such processes it is frequently desirable to maintain the granular solids as a columnar mass or bed within a confined contacting zone. Liquid is passed upwardly through the bed at a velocity below that which would substantially disrupt the bed or interfere with true countercurrent contacting of solids and liquid. While the liquid velocity may be permitted to rise to a point which causes some expansion of the mass, it is generally not desirable to permit it to rise to a level at which the granular solid particles are carried upwardly.

In most of these processes it is desirable to withdraw the liquid from the contacting zone at a level spaced above the upper surface level of the columnar mass. This serves to avoid any carry-over of solid particles from the mass through the liquid outlet, since the liquid body thereby formed above the mass will act as a settling space for the particles. It is important in all of these processes to maintain the contact time between liquid and granular solids substantially constant, so that the liquid is neither overcontacted nor undercontacted. To achieve this end, it is obviously important that the columnar mass be maintained at some fixed height. Likewise, a bed level which rises too high might cause entrainment of the solid particles in the liquid product stream.

A major object of this invention is to provide in a continuous process for contacting liquid countercurrently with a columnar mass of granular solids, a method for maintaining substantially constant the surface level of the columnar mass.

Another object of this invention is to provide a continuous process for treating liquids with granular solids which provides for efficient and effective contacting of solids and liquid without serious entrainment of the solids with the liquid product.

Another object of this invention is to provide an improved method for purifying liquid hydrocarbon oils with granular adsorbents which provides for efficient purification without excessive loss of adsorbent in the oil product stream.

A further object of this invention is to provide a method for efficiently washing adhering oil from an adsorbent which has been used in treating a liquid hydrocarbon oil.

These and other objects of the invention will become apparent from the following description of the invention.

Broadly, this invention provides a method for contacting liquids and granular solids, wherein a bed or columnar mass of granular solids is maintained within a confined contacting zone. Charge liquid is supplied to the lower section of the bed and passed upwardly therethrough at a rate insufficient to substantially disrupt the bed. The contacted liquid is removed from the upper portion of the contacting zone so that a liquid surface is formed in the upper portion. Granular solids are supplied through an inlet passage to the upper section of the bed, while used granular solids are removed from the lower section of the bed through an outlet passage. A float, having a density higher than the liquid but lower than the adsorbent bed when liquid is flowing therethrough, is suspended in the contacting zone so that the float will rise to the surface of the bed. The flow rate of granular solids in either the inlet or outlet passage is regulated in response to the level indicating the float to maintain the upper surface of the bed at a substantially constant level within a predetermined narrow range, which level is below the liquid surface level.

This invention will be best understood by referring to the attached drawings, of which Figure 1 is an elevational view, partially in section, illustrating the application of one form of this invention to a continuous lubricating oil treating process, and Figure 2 is an elevational view, partially in section, of a second form of this invention applied to a continuous lubricating oil treating process.

Both of these drawings are highly diagrammatic in form and like parts in both bear like numerals.

The granular solids employed in the process of this invention should be of palpable particulate form as distinguished from finely divided powders. Solids generally should be within the range about 4–100 mesh, and preferably 10–60 mesh, and still more preferably 15–30 mesh by Tyler standard screen analysis. The solid particles may take the form of pellets, capsules, pills, spheres or the like, or granules of irregular shape, such as are obtained by grinding and screening. The terms "palpable particulate form" and "granular" are employed herein in describing and claiming this invention to generically cover particles of any or all of these shapes having substantial size as distinguished from finely divided powders.

While this invention has wide applicability to various liquid solid contacting processes, it will be described in connection with a continuous lubricating oil treating process for the sake of simplicity but without intent to limit the invention. A recently developed continuous oil percolation process to which this invention is particularly applicable is described and claimed in now U. S. Patent No. 2,701,786 to Evans et al., and Figure 1 discloses a treating vessel suitable for use in this process. Typical adsorbents suitable for use therein are fuller's earth, bauxite, bentonite, bone char, charcoal, magnesium silicate, heat and acid activated kaolin and activated carbon. Synthetic silica or alumina or silica-alumina gel may also be employed, but preferably the preparation thereof should be controlled to provide a pore structure similar to that of the clay type adsorbent, wherein substantially more than thirty percent of the total pore volume is occupied by macropores (i. e., pores having radii greater than 100 Angstrom units).

Figure 1 shows the treating vessel of this typical lubricating oil treating process. Regenerated adsorbent is continuously fed to hopper 11 through elevator 10 which extends from an adsorbent revivification system such as a kiln. The adsorbent passes from hopper 11 through conduit 12 into a feeding box 13. Within the feeding box the adsorbent passes from conduit 12 through slots 14 into compartments maintained within the annular space around conduit 12. Solids are withdrawn from each compartment through passages 17 and passed into the upper end of percolator 18. The flow rate of adsorbent into the percolator may be fixed by regulating the height of a sleeve 15 by means of cable 16, so that a desired fixed area of slots 14 is open. This system for feeding solids into a closed vessel is described and claimed in U. S. Patent No. 2,745,795 to Penick et al. The solid adsorbent flows freely down passages 17 into the percolator and the lower ends of passages 17 are equally distributed across the cross-section of vessel 18. The lower ends of the conduits 17 are surrounded by open-ended sleeves 19 of enlarged cross-section. The liquid oil to be treated is introduced into the lower end of the percolation vessel through a passage 20 located near the bottom of the vessel. The oil may be heated to decrease its viscosity before introduction to the contacting zone, if desired. The temperature to which the oil is preheated may lie within the range 0–700° F. and should generally be below the flash point of the oil. In a typical mineral oil decolorization process, the oil might be heated to a temperature of about 300° F. before introduction to the treating zone. The adsorbent, supplied through passages 17 and 19, will exist through most of the length of the treating zone within vessel 18 as a downwardly gravitating columnar mass or bed. The oil charge passes up through this bed and the desired treatment is effected. The treating oil is removed from conduit 21 extending from the upper section of the treater. A liquid surface level will, therefore, form in the upper section of the treater at about the level of conduit 21, which is above the upper end of the columnar mass of adsorbent. The surface level of the liquid is, however, maintained below the upper ends of sleeves 19. The used adsorbent is withdrawn from the lower section of the percolator and the columnar mass through passage 22 and passed through other contacting steps to be finally returned to hopper 11 in condition for re-use in the treater. It is desirable to maintain the upper surface of the columnar mass at some carefully controlled level beneath the upper surface of the liquid in the contacting zone. The oil flow rate is controlled below the level which would disrupt this columnar mass and prevent true countercurrent contacting. A slight separation of the particles in the bed without interference with the downward movement of particles is acceptable. However, the bed in this condition is defined as an expanded bed in that the surface is lifted slightly above what it would be in compacted form. It has been discovered that the expanded bed in the contacting zone has a density substantially different from that of the liquid above the bed. In this invention, a float 24, having a density intermediate between that of the expanded bed and the liquid thereabove, is suspended within the contacting zone. This float will then remain at the interface between the bed and the liquid above and will closely follow any variation of the level of the bed. The float is connected to a lever 25, which extends outwardly through the wall of vessel 18 and is pivoted on a pin 27. The vertical movement of the outer end of lever 25, in response to the variation in the upper level of the bed, is transmitted to an operator 28 by means of connecting link 26. The operator is operatively connected to a controller 29, which in turn adjusts the adjustable control means 23 in outlet flow passage 22 to maintain the bed level substantially constant within a predetermined narrow range of levels.

The adjustable control device 23 may be any mechanism suitable for handling wet granular solids, such as the systems described and claimed in U. S. patent applications, Serial Nos. 376,686 and 376,687, both filed August 26, 1953; or a suitable star valve may be used, particularly when the improvements embodied in U. S. Patent 2,794,772, to Savoca et al. are provided. It is intended that member 23 signify any one of these devices or any other suitable device.

Rather than controlling the adsorbent outlet in response to the variation of float 24, the adsorbent inlet may be controlled while the rate of the outlet is fixed. This system is shown diagrammatically in Figure 2, which is identical with Figure 1, except that a fixed throttle 30 is provided in outlet line 22 while a variable throttle 23 is provided in line 12. A vent 60 with valve 61 is provided at the upper end of the percolator in both systems to permit the withdrawal of accumulated gases and vapor. It is generally desirable to introduce the granular solids substantially below the surface level of the liquid within the upper section of the contacting zone. By so doing, entrainment of the solvent with the outgoing oil is substantially avoided with its concomitant problem of liquid solid separation in the ancillary area. This feature is described in detail and claimed in U. S. Patent 2,749,290 to Penick et al. Preferably, the solids are introduced at a level about 6 inches below the liquid draw-off level and preferably about 18–36 inches below that level.

It is also desirable to maintain the level of the columnar mass or bed of solids at least 6 inches and preferably 18–36 inches below the level of solids introduction into the liquid body from the lower ends of sleeves 19. This helps to form a bed of constant depth across its entire cross-section.

As well as its many other uses, this invention will also find use in the washing step of a continuous percolation process. This step normally follows the oil-solids contacting and may be performed in a vessel similar to that shown in both Figures 1 and 2. Adsorbent can only be withdrawn from the percolation step admixed with a certain amount of oil. This oil may either be in the pores of the adsorbent or in the voids between the adsorbent particles, and for economical operation, it is desirable that it be recovered. The adsorbent and oil would be charged to the upper end of a vessel, like 18, and passed therethrough as a columnar mass. The process would operate in a very similar manner to the percolation step, except that a wash solvent would be supplied through passage 20 rather than oil charge. Washed adsorbent would be withdrawn through 22 and the bed level of adsorbent in the washer would be controlled by float 24 in the same manner as described above. Typical solvents which might be used for the washing include carbon tetrachloride, normal heptane, normal octane, petroleum naphtha boiling within the range 100–400° F. and carbon disulfide. A preferred solvent is a paraffinic naphtha boiling within the range 210–300° F. The washing step typically might be conducted at a temperature within the range 60–250° F.

*Example*

Using a treating vessel of 3.2 inches in diameter and 3.5 feet in height, adsorbent solids of about 30–60 mesh Tyler were introduced into the top of the vessel at a level about 12 inches below its upper end. The solids were removed from the bottom of the vessel at a flow rate of about 0.31 pound per hour. Oil at 73° F. was introduced into the bottom of the vessel at a rate of about 5.7 pounds per hour and flowed upwardly through the vessel at a superficial velocity of 2 feet per hour. The oil density at the temperature of introduction was 0.817 gram per cubic centimeter. The bed level with no flow therethrough was 2.540 feet in height, whereas in expanded condition it was 2.594 feet. Under these conditions, it was found that a float having a density of 0.8350 gram per cubic centimeter was highly responsive to changes in level of the bed and could be used to effect control of the valve in the absorbent outlet to provide a constant bed level for process and operational stability.

The broader claims in U. S. patent application, Serial No. 387,744, filed October 22, 1953, dominate the invention specifically claimed herein.

This invention should be understood to cover all changes and modifications of the examples of the invention herein chosen for purposes of disclosure which do not constitute departures from the spirit and scope of the invention.

I claim:

1. In a continuous cyclic process for treating oils to purify the same, the improved method of contacting the oil and solid adsorbent, which comprises: introducing an oil feed into the lower section of a vertically extended percolation zone and withdrawing the oil from said zone at a higher elevation to maintain a liquid surface level in the upper portion of said zone, introducing adsorbent in palpable particulate form into the percolation zone through at least one laterally confined inlet flow passage which is terminated at its lower end at a level beneath the liquid surface level in the percolation zone, withdrawing the adsorbent from the lower portion of said zone through an outlet flow passage at a flow rate low enough to maintain a columnar mass with upper surface level in said percolation zone below the level at which the material is discharged from said confined passage, maintaining the flow rate of the upwardly moving oil in said percolation zone at a rate insufficient to substantially disrupt the columnar mass of adsorbent in said zone, suspending in the percolation zone a float having a density higher than the oil but low enough to cause the float to be lifted upwardly through the oil-solids columnar mass to the top of the columnar mass during contacting, and adjusting the flow rate of the stream of adsorbent passing through one of said flow passages in response to any change in the elevation of the float while maintaining the flow rate of the other stream substantially constant, whereby the columnar mass upper surface level is maintained substantially constant within a predetermined narrow range.

2. In a continuous cyclic process for treating oils to purify the same, the improved method of contacting the oil and solid adsorbent, which comprises: introducing an oil feed into the lower section of a vertically extended percolation zone and withdrawing the oil from said zone at a higher elevation to maintain a liquid surface level in the upper portion of said zone, introducing adsorbent in palpable particulate form into the percolation zone through at least one laterally confined passage which is terminated at its lower end at a level beneath the liquid surface level in the percolation zone, withdrawing the adsorbent from the lower portion of said zone at a flow rate low enough to maintain a columnar mass with upper surface level in said percolation zone below the level at which the material is discharged from said confined passage, maintaining the flow rate of the upwardly moving oil in said percolation zone at a rate insufficient to substantially disrupt the columnar mass of adsorbent in said zone, suspending in the percolation zone a float having a density higher than the oil but low enough to cause it to be lifted upwardly through the oil-solids mass to the top of the mass during contacting, maintaining the flow rate at which the adsorbent is introduced into said percolation zone substantially constant, and adjusting the flow rate at which the adsorbent is withdrawn from said percolation zone in response to any change in the elevation of said float, whereby the columnar mass upper surface level is maintained substantially constant within a predetermined narrow range.

3. In a continuous cyclic process for treating oils to purify the same, the improved method of contacting the oil and solid adsorbent, which comprises: introducing an oil feed into the lower section of a vertically extended percolation zone and withdrawing the oil from said zone at a higher elevation to maintain a liquid surface level in the upper portion of said zone, introducing adsorbent in palpable particulate form into the percolation zone through at least one laterally confined passage which is terminated at its lower end at a level beneath the liquid surface level in the percolation zone, withdrawing the adsorbent from the lower portion of said zone at a flow rate low enough to maintain a columnar mass with upper surface level in said percolation zone below the level at which the material is discharged from said confined passage, maintaining the flow rate of the upwardly moving oil in said percolation zone at a rate insufficient to substantially disrupt the columnar mass of adsorbent in said zone, suspending in the percolation zone a float having a density higher than the oil but low enough to cause it to be lifted upwardly through the oil-solids mass to the top of the mass during contacting, maintaining the flow rate at which the adsorbent is withdrawn from said percolation zone substantially constant, and adjusting the flow rate at which the adsorbent is introduced into said percolation zone in response to any change in the elevation of said float, whereby the columnar mass upper surface level is maintained substantially constant within a predetermined narrow range.

4. In a continuous cyclic process for treating oils to purify the same, the improved method of contacting the oil and solid adsorbent, which comprises: introducing an oil feed into the lower section of a vertically extended percolation zone and withdrawing the oil from said zone at a higher elevation to maintain a liquid surface level in the upper portion of said zone, introducing adsorbent in palpable particulate form into the percolation zone through at least one laterally confined passage which is terminated at its lower end at least 6 inches below the liquid surface level in the percolation zone, withdrawing the adsorbent from the lower portion of said zone at a flow rate low enough to maintain a columnar mass with upper surface level in said percolation zone below the level at which the material is discharged from said confined passage, maintaining the flow rate of the upwardly moving oil in said percolation zone at a rate insufficient to substantially disrupt the columnar mass of adsorbent in said zone, suspending in the percolation zone a float having a density higher than the oil but low enough to cause it to be lifted upwardly through the oil-solids mass to the top of the mass during contacting, maintaining the flow rate at which the adsorbent is introduced into said percolation zone substantially constant, and adjusting the flow rate at which the adsorbent is withdrawn from said percolation zone in response to any change in the elevation of said float, whereby the columnar mass upper surface level is maintained substantially constant within a predetermined narrow range.

5. In a continuous cyclic process for treating oils to purify the same, the improved method of contacting the oil and solid adsorbent, which comprises: introducing an oil feed into the lower section of a vertically extended percolation zone and withdrawing the oil from said zone at a higher elevation to maintain a liquid surface level in the upper portion of said zone, introducing adsorbent in palpable particulate form into the percolation zone through at least one laterally confined passage which is terminated at its lower end at about 18–36 inches below the liquid surface level in the percolation zone, withdrawing the adsorbent from the lower portion of said zone at a flow rate low enough to maintain a columnar mass with upper surface level in said percolation zone below the level at which the material is discharged from said confined passage, maintaining the flow rate of the upwardly moving oil in said percolation zone at a rate insufficient to substantially disrupt the columnar mass of adsorbent in said zone, suspending in the percolation zone a float having a density higher than the oil but low enough to cause it to be lifted upwardly through the oil-solids mass to the top of the mass during contacting, maintaining the flow rate at which the adsorbent is introduced into said percolation zone substantially constant, and adjusting the flow rate at which the adsorbent is withdrawn from said percolation zone in response to any change in the elevation of said float, whereby the columnar mass upper surface level is maintained substantially constant within a predetermined narrow range.

References Cited in the file of this patent

UNITED STATES PATENTS

| | | |
|---|---|---|
| 2,438,728 | Tyson | Mar. 30, 1948 |
| 2,458,162 | Hagerbaumer | Jan. 4, 1949 |
| 2,470,339 | Claussen et al. | May 17, 1949 |
| 2,552,435 | Knox et al. | May 8, 1951 |
| 2,606,863 | Rehbein | Aug. 12, 1952 |
| 2,631,727 | Cichelli | May 17, 1953 |
| 2,696,305 | Slover | Dec. 7, 1954 |

FOREIGN PATENTS

| | | |
|---|---|---|
| 538,400 | Great Britain | Aug. 1, 1941 |

OTHER REFERENCES

Perry: Chemical Engineers Handbook, second ed. (1941), pages 2040 and 2047–49. McGraw-Hill Book Co., New York, N. Y.